United States Patent
Rousseil et al.

(10) Patent No.: US 10,630,149 B2
(45) Date of Patent: Apr. 21, 2020

(54) MODULE FOR CONTROLLING THE POWER SUPPLY OF AN ELECTRIC MOTOR

(71) Applicant: Valeo Systemes Thermiques, Le Mesnil Saint Denis (FR)

(72) Inventors: Xavier Rousseil, Le Mesnil Saint Denis (FR); Xavier Goumain, Le Mesnil Saint-Denis (FR); Jonathan Fournier, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 199 days.

(21) Appl. No.: 15/775,739

(22) PCT Filed: Nov. 9, 2016

(86) PCT No.: PCT/FR2016/052916
§ 371 (c)(1),
(2) Date: May 11, 2018

(87) PCT Pub. No.: WO2017/081415
PCT Pub. Date: May 18, 2017

(65) Prior Publication Data
US 2019/0207485 A1  Jul. 4, 2019

(30) Foreign Application Priority Data

Nov. 13, 2015 (FR) ..................................... 15 60884

(51) Int. Cl.
*H02K 11/00* (2016.01)
*H02K 11/33* (2016.01)
(Continued)

(52) U.S. Cl.
CPC ............. *H02K 11/33* (2016.01); *H02K 3/522* (2013.01); *H02K 5/225* (2013.01); *B60H 1/24* (2013.01); *H02K 2211/03* (2013.01)

(58) Field of Classification Search
CPC ........ H02K 11/33; H02K 3/522; H02K 5/225; H02K 2203/03; H02K 2211/03; H02K 11/30
(Continued)

(56) References Cited

U.S. PATENT DOCUMENTS 3,924,147 A * 12/1975 Tarnow .................. H02K 5/148
310/68 R
6,661,134 B2 * 12/2003 Sunaga .................. H02K 11/33
310/64
(Continued)

FOREIGN PATENT DOCUMENTS

WO  2012023245 A1  2/2012

OTHER PUBLICATIONS

International Search Report issued in PCT/FR2016/052916 dated Feb. 16, 2017 (4 pages).
(Continued)

*Primary Examiner* — Thanh Lam
(74) *Attorney, Agent, or Firm* — Osha Liang LLP

(57) ABSTRACT

The invention relates to a module for controlling the power supply (10) of an electric motor which comprises a printed circuit board (12) bored with a plurality of through-holes (30), respectively associated with an electrical connection pad (32) supported by said plate adjacent to each of said through-holes. The electrical connection pads (32) are arranged on a surface (26) of the printed circuit board (12) so that a virtual circle can be defined passing substantially through each of the connection pads, said pads being concentrated on a portion of the printed circuit board so as to form an arc of circle which is shorter than half the circumference of said virtual circle.

15 Claims, 2 Drawing Sheets

(51) Int. Cl.
*H02K 5/22* (2006.01)
*H02K 3/52* (2006.01)
*B60H 1/24* (2006.01)

(58) Field of Classification Search
USPC ........................................ 310/68 R, 68 D, 71
See application file for complete search history.

(56) References Cited

U.S. PATENT DOCUMENTS

| | | | |
|---|---|---|---|
| 9,148,044 B2* | 9/2015 | De Filippis | F04D 25/08 |
| 9,479,025 B2* | 10/2016 | Kawata | B62D 5/0463 |
| 2006/0006094 A1 | 1/2006 | Hofmann et al. | |
| 2014/0175922 A1* | 6/2014 | Jore | H02K 1/12 |
| | | | 310/71 |
| 2014/0183992 A1* | 7/2014 | Seo | H02K 15/0068 |
| | | | 310/71 |
| 2017/0358973 A1* | 12/2017 | Jugovic | H02K 5/18 |
| 2018/0084646 A1* | 3/2018 | Purohit | H02K 11/215 |

OTHER PUBLICATIONS

Written Opinion issued in PCT/FR2016/052916 dated Feb. 16, 2017 (6 pages).

* cited by examiner

MODULE FOR CONTROLLING THE POWER SUPPLY OF AN ELECTRIC MOTOR

The present invention relates to the field of electric motors with electronic switching, particularly in the case of application to air pulsing devices in motor vehicles.

An air pulsing device equipped with an electric motor according to the invention is, for example, used in a ventilation, heating and/or air conditioning system of a motor vehicle.

The electric motors with electronic switching, or brushless direct current motors comprise a rotor and stator assembly, each of these components being the bearer of electromagnetic elements whose interaction generates the displacement of the rotor relative to the stator. The displacement of the rotor is driven by an electrical power supply of the electromagnetic elements borne by the stator. Motor connection elements link the stator and electronic devices borne by a printed circuit board. These connection elements extend axially from the stator and pass through the printed circuit board in bores provided for this purpose, to then be soldered onto pads arranged on the face of the printed circuit board oriented away from the motor.

A three-phase motor comprises three motor connection elements, evenly distributed at 120° about the axis of rotation of the rotor/stator assembly and the circuit board bearing electronic devices as bores, provided for the passage of these connection elements, which are correspondingly evenly distributed at 120°.

The present invention lies within this context and it aims to offer an alternative to the constructions of electric motor power supply control modules that are otherwise known, particularly in the case of application of a three-phase motor as has just been presented. The invention also aims to propose, in this context, an associated air pulsing device.

An air pulsing device should be understood to be a device that makes it possible to suck and/or blow air.

The power supply control module of an electric motor with electronic switching according to the invention is of the type comprising a printed circuit board drilled with a plurality of through-holes, respectively capable of allowing passage to a motor connection element that is otherwise made integral to a stator of the electric motor, respectively associated with an electrical bonding pad borne by said board in t vicinity of each of these through-holes. Each electrical bonding pad is intended to be connected to the connection element passing through the board via a through-hole. According to the invention, the corresponding electrical bonding pads are arranged on a face of the board in such a way that it is possible to define a virtual circle passing substantially through each of the bonding pads, said pads being concentrated on a part of the board so as to form a circular arc of a length smaller than half the circumference of said virtual circle.

It will be understood that, according to the invention, the through holes and the electrical bonding pads are grouped together in one and the same part of the printed circuit board, in such a way that they are no longer, as in the prior art, arranged evenly so as to form a circle around a point aligned on the axis of revolution of the electric motor associated with the printed circuit board, but that they are arranged in a circular arc, in a tighter configuration.

According to a particular embodiment, the printed circuit board has a main bore around which said through-holes are arranged such that the center of the main bore substantially coincides with the center of said virtual circle, said electrical bonding pads being distributed on one and the same side in relation to the main bore. The expression "substantially coincides" should be understood to reflect the desire to specify that the center of the main bore coincides with the center of the virtual circle or that it can, without departing from the context of the invention, be positioned very close to this center of the virtual circle.

According to a series of features, taken alone or in combination, it will be possible to provide for:

the center of said virtual circle to be offset in relation to the barycenter of the printed circuit board in particular by being closer to a first edge of the board than to an opposite second edge;

the through-holes and the corresponding bonding pads to be arranged between said opposite second edge and a straight line substantially parallel to this opposite second edge and passing through the center of said virtual circle;

the printed circuit board to comprise transistors linked by an electrical track to a power supply circuit, said transistors being arranged in a plurality of groups of transistors respectively arranged around a through-hole and a corresponding bonding pad;

three through-holes, and three corresponding bonding pads, to be evenly distributed on one and the same side of the printed circuit board in relation to the center of said virtual circle;

a central through-hole to be arranged at substantially 60°, around an axis passing through the center of the virtual circle, in relation to the other two lateral through-holes surrounding it;

the printed circuit board to comprise a plurality of electronic devices and at least one electrical track configured to link the electronic devices to one another and to electrical power supply means and to said electrical bonding pads;

the electrical track or tracks to be arranged at the periphery of the printed circuit board, around said through-holes and the associated electronic devices;

the board to have a polygonal form and a substantially straight first edge formed by a flat such that said first edge is closer to the center of said virtual circle, arranged substantially at the center of the polygonal form of the board before it is cut by the flat;

said electronic devices to comprise at least one coil forming a power supply current input filter arranged opposite, in relation to the center of said virtual circle, the through-holes and the corresponding bonding pads, along the first edge of the board.

According to another series of features, taken alone or in combination, it will be possible to provide for:

the printed circuit board to be formed by two superposed layers;

a first layer of the board to bear the electrical tracks of the ground and the second layer of the board to bear the electrical tracks of the positive power supply;

the first layer to be the layer from which the electronic components protrudingly extend.

The invention relates also to an electric motor comprising a rotor/stator assembly and a power supply control module as described previously, the electrical bonding pads being configured to be integral to motor connection elements made integral to the stator and extending parallel to the axis of rotation of the rotor about the stator.

This electric motor will be able to be such that the printed circuit board comprises a main bore that can be passed through by a drive shaft secured in rotation to the rotor, the through-holes can be passed through by the motor connection elements being distributed evenly around the main axis, on the same side of the board in relation to this main bore.

"The same side of the board" should be understood to mean that it is possible to cut the board into two parts by a straight line passing through the main bore and that all of the through-holes are arranged in just one of the two parts.

The present invention relates also to an air pulsing device equipped with an electric motor in accordance with what has just been described previously, and a heating, ventilation and/or air conditioning system of a motor vehicle comprising at least one such air pulsing device.

Other features and advantages of the invention will become apparent on reading the following detailed description of an embodiment and for an understanding of which reference will be made to the attached drawings in which.

Figure 1:
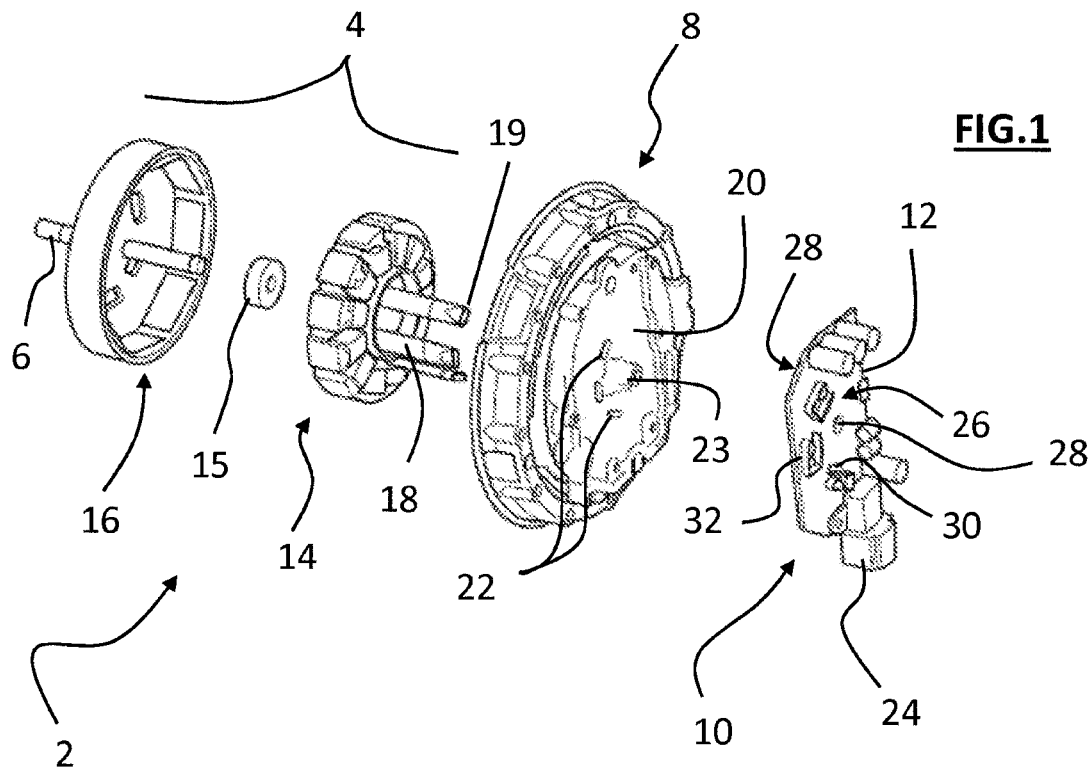
FIG. 1 is a perspective exploded representation of an air pulsing device comprising an electric motor with electronic switching and a power supply control module according to the invention.
Figure 2:
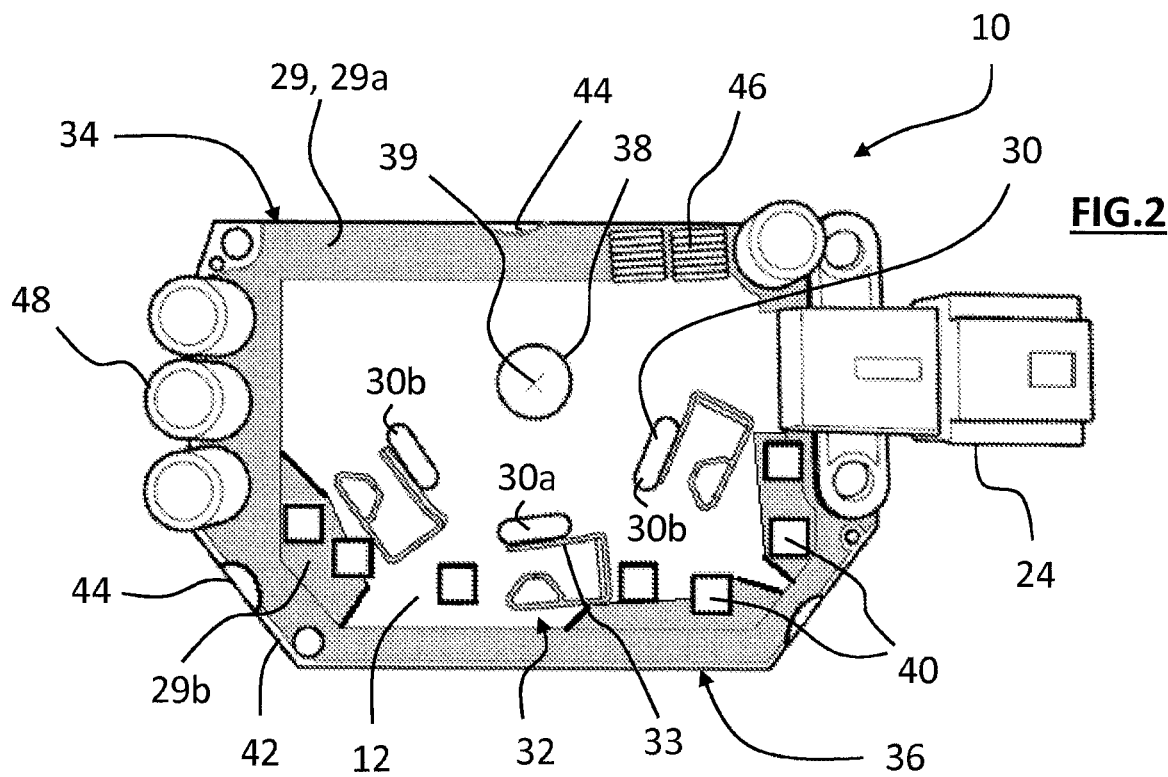
FIG. 2 is a front view of the power supply control module illustrated in FIG. 1.
Figure 3:
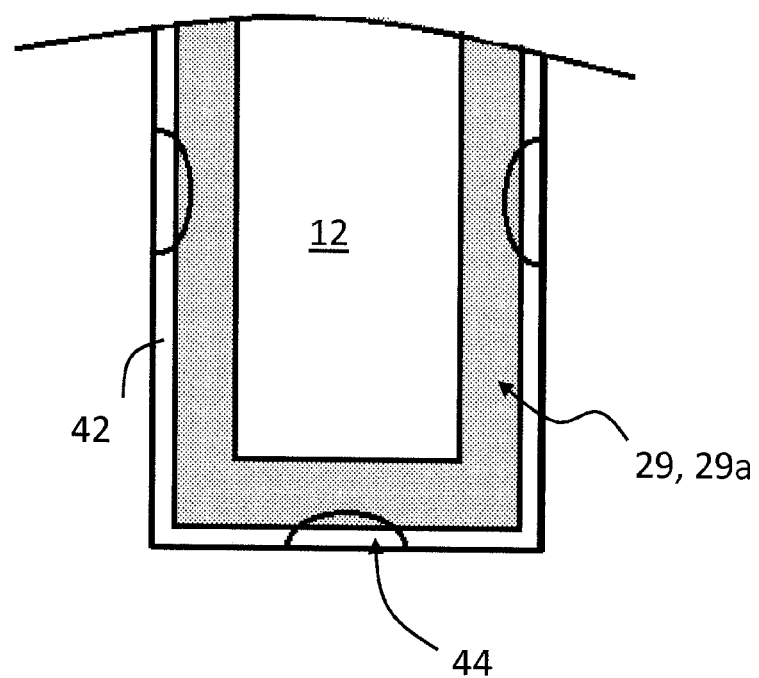
Figure 4:
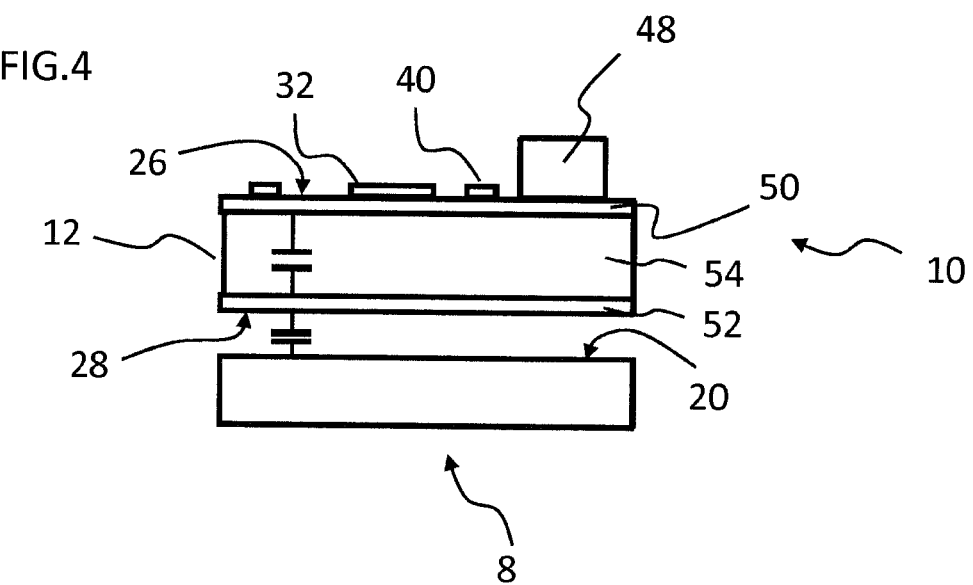

FIG. 3 schematically illustrates the arrangement of the electrical tracks on the printed circuit board of the power supply control module according to the invention; and FIG. 4 schematically illustrates, in a vertical cross-sectional view, the control module illustrated in FIG. 2 and an associated support means, also visible in FIG. 1.

An air pulsing device 2, which makes it possible to suck and/or blow air, comprises at least one electric motor with electronic switching 4, capable of rotationally driving a fan wheel, not represented here, via an output shaft 6 of the electric motor. The device further comprises at least one support means 8 incorporating several functions, including the support of the electric motor, the cooling of the components of said device and the support of a power supply control module 10 of the motor, comprising in particular a printed circuit board 12.

The electric motor primarily comprises an inducing stator 14 and an induced rotor 16, bearing the output shaft 6 capable of driving the fan wheel. The stator 14 is made integral to the support means 8 of the motor, and the rotor 16 is arranged around the stator 14 to be driven in rotation under the effect of the magnetic fields generated by the winding and the magnets associated with the rotor and with the stator.

In the air pulsing device comprising the electric motor according to the invention, the various components are arranged in such a way that the stator 14 is arranged facing the support means 8 and that the latter is interposed between the rotor/stator assembly and the power supply control module 10, said support means forming a heat sink bearing the printed circuit board 12. Preferentially, the support means 8 is made of metal, so as to effectively cool, by thermal conduction, the electronic components home by this board. The support means can in particular be made of aluminum, such that, for this part, characteristics of lightness and of good thermal conduction are associated therewith.

As can be seen in FIG. 1, the stator 14 has an annular form prolonged radially by a plurality of teeth arranged in star configuration. These teeth each bear a winding of winding wire capable of generating a magnetic field participating in the displacement of the rotor relative to the stator, under the effect of the permanent magnets that they respectively bear, the output shaft 6 integral to the rotor 16 being mounted to rotate relative to the support means via bearings 15. These bearings can be ballbearings, as schematically illustrated, but it will be understood that they could take the form of roller, needle or other such bearings.

The stator 14 comprises an excitation winding composed of several phases, each comprising at least one wire winding, whose outputs are electrically connected to power supply means borne by the power supply control module 10, via pin contacts 18 integral to the stator and forming motor connection elements that can be connected to complementary connection means borne the printed circuit board as will be described hereinbelow. In the particular embodiment as illustrated, the stator comprises twelve teeth wound in three-phase configuration and three pin contacts 18, distinct and respectively associated with each of the phases, form connection elements of the motor. These pin contacts 18 extend longitudinally from the stator, parallel to the axis of rotation of the rotor/stator assembly, and they pass through the support means 8 to be respectively connected, at their free end 19, to complementary connection means integral to the printed circuit board 12.

The support means 8 allows the fixing of all of the components of the electric motor and of the power supply means of this motor relative to the structure of the vehicle. It has in particular, on a first face 20, a zone for receiving the printed circuit board 12, and, on an opposite second face, a stem, not visible here, on which the stator 14 is mounted. Here, the support means is noteworthy in that it comprises a plurality of through-bores 22 formed in this support means so as to longitudinally extend from the first face 20 to the opposite face. The through-bores 22 have a form complementing that of the pin contacts 18, with dimensions slightly greater than those of the pin contacts to allow the passage thereof through the support means. Moreover, the longitudinal dimension of the pin contacts and the thickness of the support means are such that the free end 19 of the pin contacts 18 extend beyond the first face 20 of the support means 8 when the pin contacts have passed through the latter. As is detailed hereinbelow, it is advantageous that the first face 20 has, substantially at its center, a stem 23 for centering the printed circuit board 12. As was able to be specified previously, and this being able to be applied for each use of this term in the description, it is understood that the use of the term substantially allows the inclusion in the context of the invention of slightly different arrangements, here, a position of the stem not exactly centered on the first face, but positioned with a slight offset relative to the center.

The electric power supply module 10 comprises a printed circuit board 12 and a connection end-fitting 24 for connecting to an electrical network, the connection end-fitting and a plurality of electronic components being mounted, in particular soldered, on a first face 26 of the printed circuit board 12. The second face 28 of this printed circuit board 12 is intended to be pressed against the support means 8, and to this end, it does not have protruding electronic components. The board also bears, on one face and/or on the other, at least one electrical track 29 capable of linking the electronic components to one another and with the connection end-fitting 24.

The printed circuit board 12 in particular comprises through-holes 30, as many thereof as there are pin contacts 18 forming the motor connection elements, here three, so that the free end 19 of these pin contacts can go beyond the printed circuit board when the stator 14 and the electrical power supply module 10 are mounted on either side of t support means 8. Each of these through-holes 30 is associated with a bonding pad arranged in the vicinity of a through-hole, so as to be able to be secured, in particular by soldering, to a pin contact 18. It is understood that each bonding pad is connected to the electrical track 29 and that a transmission of current can occur, when all the components are mounted, from the connection end-fitting 24 to the phases of the stator, via, in succession, the electrical track 29, the electronic components, the bonding pads 32 and the pin contacts 18.

In the embodiment illustrated, each of the bonding pads 32 is substantially U-shaped, with one wing 33 level with the corresponding through-hole in order for the free end 19 of a pin contact 18 to be able to be pressed against this wing and soldered.

Referring in particular to FIG. 2, the form of the printed circuit board 12 will be detailed, together with the arrangement of the electronic components and of the through-holes 30 and of the bonding pads 32 on this printed circuit board 12.

The board here has a polygonal form in which two opposite edges, substantially parallel to one another, can be identified. One of these edges, defined as a first edge 34, is formed by a flat which modifies the regular form of the polygon. The result thereof is that the center of the regular polygon in which the plate is inscribed is located closer to the first edge 34 than to the opposite edge 36.

A bore, called main bore 38, is produced in the vicinity of this virtual center of the polygon that the plate forms, to form an indexing means with the centering stem 23 protruding from the first face 20 of the support means 8.

The printed circuit board here comprises two layers, for example of copper, superposed on one another, with an insulating layer (layer of epoxypolymer PR4 for example) between them.

The through-holes 30 and the corresponding electrical bonding pads 32 are arranged on a face of the printed circuit board 12 in the form of a circular arc, in such a way that it is possible to define a virtual circle passing substantially through each of the bonding pads and a center of this virtual circle 39. In particular, it can be seen in the embodiment illustrated that the through-holes and the corresponding electrical bonding pads are arranged on a confined part of the board relative to the main bore 38, being distributed regularly around the latter over the portion of circular arc that they delimit.

The through-holes, respectively the electrical bonding pads, are thus concentrated on a part of the board so as to form a circular arc passing in succession through each of them, of a length smaller than half of the circumference of said virtual circle.

In the example illustrated, the three pin contacts 18 forming the motor connection elements are arranged in the same half of the stator, spaced apart approximately by 60°, and the result thereof is an equivalent production of the through-bores 22 produced in the support means 8 and of the through-holes 30 formed on the printed circuit board.

The position of the through-holes 30, respectively of the connectors 32, on the printed circuit board 12, is such that they define a circular arc on a virtual center 39 around which the through-holes are distributed equidistantly. It will be understood that when the assembly is mounted, this virtual center defining the position of the through-holes of the board is arranged on the axis of rotation of the rotor/stator assembly. Of the three through-holes 30 of the printed circuit board, it will be possible to distinguish a central through-hole 30a, which, in the circular arc defined by the succession of the through-holes, is arranged between the lateral through-holes 30b defining the ends of this circular arc. Each of these lateral through-holes is arranged at 60°, taking the center of the virtual circle for reference, from the central through-hole 30a.

As was able to be specified previously, and as can be seen in FIG. 2 in particular, the center of the virtual circle defined by the position of the through-holes 30, here advantageously coinciding with the center of the main bore 38, is closer to the first edge 34 of the board 12 than to the opposite second edge 36, and it is notable that the through-holes and the corresponding bonding pads are arranged between the opposite second edge and a straight line substantially parallel to this opposite second edge and passing through the center of said virtual circle.

This particular arrangement of the through-holes 30 and of the associated bonding pads 32, concentrated on a half of the printed circuit board 12, is accompanied by a particular arrangement of some of the electronic components soldered on this board. Indeed, the electronic components comprise, among other things, power transistors 40 which are arranged on the electrical track 29 between the motor connection elements and the connection end-fitting 24 of the power supply means, and these transistors 40 are advantageously arranged in groups of transistors around each of the bonding pads, as close as possible to the pin contact 18 intended to be soldered onto this bonding pad 32. It is thus possible to minimize the lengths of the electrical tracks which offers advantages equally in terms of thermal, bulk and electromagnetic radiation reduction considerations. Furthermore, it is advantageous to group together most of the various electronic components in one half of the printed circuit board to simplify the cooling of these components by one and the same air stream circulating in the device.

The flat, which forms the first edge 34 and which modifies the regular polygonal form of the printed circuit board 12, can be easily produced because of the arrangement on a same side of this printed circuit board, of the through-holes 30 and of the associated bonding pads 32, and of the power transistors 40 grouped around these bonding pads. It is thus possible to offer a printed circuit board with reduced dimensions compared to the prior art and achieve significant economies of scale on a mass production of such printed circuit boards.

Moreover, the printed circuit board 12 is arranged in such a way that said at least one electrical track 29 is arranged essentially on the outer perimeter of the printed circuit board, that is to say running along the edges of the board. The electrical track thus has a substantially annular main portion 29a, which extends over all the perimeter of the board, and branches 29b which go from this main portion toward the center of the board to link the transistors. This configuration and the passage of a continuous power current in this substantially annular portion 29a makes it possible to produce a guard ring around the board, that is to say an electromagnetic shielding preventing, among other things, the electromagnetic waves originating from outside the device from disrupting the operation of the motor power supply module.

In order in particular to allow the handling of the printed circuit board, an insulating edge 42 is arranged over all the perimeter of the board. Insulating edge should be understood to mean that the electrical track 29 does not extend from the edge of the board, but that a zone free of electrically conducting elements is arranged over a determined dimension from this edge, over approximately 2 to 3 millimeters for example. This insulating edge, that can be seen in FIG. 2, has been made particularly visible in FIG. 3 where this peripheral arrangement of the annular portion 29a on the partially-represented printed circuit board has been schematically represented.

Various indentation-forming zones 44 are formed and it is noteworthy that the indentation-forming zones encroach only on the insulating edge 42 and on the annular portion 29*a* of the electrical track 29, so that no electronic component is provided in proximity to these zones. The indentation-forming involves an industrial operation of cutting a printed circuit board to the desired dimensions from a panel produced in large industrial dimensions. The indentation-forming is a fast and cost-effective cutting method, but this industrial method conventionally adds constraints to the design, because electronic components cannot be arranged close to indentation-forming points, situated at the board edge. The components must necessarily be at a distance, approximately at least 5 mm, from the indentation-forming zone to avoid the destruction thereof. It will be understood that by placing the power tracks at the edge of the printed circuit board, and not the components, it becomes possible to have the space needed to do the indentation-forming.

The printed circuit board 12 bears a plurality of electronic components, including the power transistors 40 already described. A coil 46 can also be cited, arranged in proximity to the connection end-fitting 24 of the power supply means to filter the power supply voltage, as well as a plurality of capacitors 48, here arranged in series to store electrical energy.

The capacitors 48 and the coil 46 are arranged along the annular portion 29*a* of the electrical track on a same first face 26 of the printed circuit board 12. When the device is assembled, this first face is turned away from the support means 8, such that the components do not hamper the pressing of the board against the support means 8.

In the context of what has been described previously, that is to say a printed circuit board 12 produced by a superpositioning of two layers to be etched, it is advantageous to provide for the electrical tracks 29 to be distributed on both of the two layers of the printed circuit board. Reference will be made in particular to FIGS. 3 and 4 for the description of such an arrangement.

The electrical tracks on each of a first layer 50 and of a second layer 52 are produced at the periphery of the corresponding layer, in an annular arrangement as previously described, such that the electrical tracks are situated one on top of the other, separated by the layer of epoxy polymer 54.

The electrical track formed on the first layer 50 is used to make a ground guard ring, that is to say connected to the electrical ground, and the electrical track formed on the second layer 52 is used to make a guard ring connected to a positive voltage terminal supplying, for example, a voltage substantially equal to 12V.

The ground guard ring and the positive guard ring are arranged facing one another, one on top of the other, which on the one hand has the effect of reducing the surface area on the printed circuit board of the radiating surfaces, and which creates stray capacitances that are advantageous for the electromagnetic shielding function, as is illustrated in FIG. 4.

The layout thereof or of a particular track on one or other of the faces of the printed circuit board addresses several considerations. It is on the one hand advantageous to provide for the electromagnetic pollution tracks, that is to say the tracks connected to the positive terminal, to be arranged on the side of the printed circuit board that is to be pressed against the support means, in order to confine them and limit the propagation thereof. It is also advantageous to encircle these pollution tracks with a shielding on the one hand formed by the aluminum support means electrically linked to the ground and on the other hand formed by the particular geometry of the electrical tracks on the first layer 50 linked once again to the electrical ground. In the latter case, the second layer 52 is enclosed between two ground shieldings, through, on the one hand, the first layer 50 which incorporates a ground plane and a guard ring and, on the other hand, through the support means 8, forming a metal heat sink, which is linked electrically to the ground.

The above description aims to explain how the invention makes it possible to achieve the objectives set for it and in particular propose a power supply control module and the associated electric motor which make it possible, by a particular arrangement of the usual components of such devices, on the one hand to limit the size of the printed circuit board and therefore of the control module, which makes it possible in particular to limit the cost price of the module, and on the other hand to condense the electrical tracks and the components on this printed circuit board, which for example makes it possible to limit the radiating surfaces on these boards and position the electronic components more efficiently in a cooling air stream.

However, the invention is not limited to just the arrangement described in light of the figures, given that all the bonding pads and the through-holes for the connection elements are arranged on the same side relative to the central bore. In particular, the number of bonding pads and the number of through-holes could be other than three as described in the case of an application to a polyphase motor other than three-phase, given that they are arranged on the same side of the board, as was able to be described previously.

The invention claimed is:

1. A module for controlling the power supply of an electric motor comprising:
   a printed circuit board drilled with a plurality of through-holes respectively associated to an electrical bonding pad borne by said board in the vicinity of each of these through-holes,
   wherein the electrical bonding pads (32) are arranged on a face (26) of the printed circuit board so as to define a virtual circle passing substantially through each of the bonding pads, said pads being concentrated on a part of the printed circuit board to form a circular arc of a length smaller than half the circumference of said virtual circle.

2. The module as claimed in claim 1, wherein the printed circuit board has a main bore around which said through-holes are arranged such that the center of the main bore substantially coincides with the center of said virtual circle, said electrical bonding pads being distributed on one and the same side in relation to the main bore.

3. The module as claimed in claim 1, wherein the center of said virtual circle is offset in relation to the barycenter of the printed circuit board closer to a first edge of the printed circuit board than to an opposite second edge.

4. The module as claimed in claim 3, wherein the through-holes and the corresponding bonding pads are arranged between one of the edges of the printed circuit board and a straight line substantially parallel to this edge and passing through the center of said virtual circle.

5. The module as claimed in claim 3, wherein the printed circuit board has a polygonal form in which said substantially straight first edge is formed by a flat.

6. The module as claimed in claim 1, wherein said printed circuit board comprises transistors linked by an electrical track to a power supply circuit, said transistors being arranged in a plurality of groups of transistors respectively arranged around a through-hole and a corresponding bonding pad.

7. The module as claimed in claim 1, further comprising three through-holes, and three corresponding bonding pads, evenly distributed on one and the same side of the printed circuit board in relation to the center of said virtual circle.

8. The module as claimed in claim 7, wherein a central through-hole is arranged at substantially 60°, around an axis passing through the center of said virtual circle, in relation to the other two lateral through-holes surrounding it.

9. The module as claimed in claim 3, wherein the printed circuit board comprises a plurality of electronic devices and at least one electrical track configured to link the electronic devices to one another and to said electrical power supply means and to said electrical bonding pads.

10. The module as claimed in claim 9, wherein the electrical track or tracks are arranged at the periphery of the printed circuit board, around said through-holes and the associated electrical bonding pads.

11. The module as claimed in claim 10, wherein said electronic devices comprise at least one coil forming a power supply current input filter and arranged opposite, in relation to the center of said virtual circle, the through-holes and the corresponding bonding pads, along the first edge of the board.

12. The module as claimed in claim 1, wherein the printed circuit board is formed by two superposed layers.

13. The module as claimed in claim 12, wherein a first layer of the board bears the electrical tracks of the ground and in that the second layer of the board bears the electrical tracks of the positive power supply.

14. The module as claimed in claim 13, wherein the first layer is the layer from which the electronic components protrudingly extend.

15. An electric motor comprising:
a rotor/stator assembly; and
the power supply control module as claimed in claim 1, the electrical bonding pads being configured to be integral to motor connection elements made integral to the stator and extending parallel to the axis of rotation of the rotor about the stator.

* * * * *